United States Patent [19]

Krummel et al.

[11] Patent Number: 5,155,154
[45] Date of Patent: Oct. 13, 1992

[54] POLYVINYL CHLORIDE-FREE PLASTISOL AND ITS USE

[75] Inventors: Karl-Heinz Krummel, Gettorf; Ernst Lohmar, Weinheim; Thomas Stankiewicz, Celle, all of Fed. Rep. of Germany

[73] Assignee: Dr. Alois Stankiewicz GmbH, Adelheidsdorf, Fed. Rep. of Germany

[21] Appl. No.: 649,613

[22] Filed: Dec. 22, 1988

Related U.S. Application Data

[63] Continuation of Ser. No. 800,821, Nov. 22, 1985, abandoned.

[30] Foreign Application Priority Data

Nov. 22, 1984 [DE] Fed. Rep. of Germany ....... 3442646

[51] Int. Cl.$^5$ .............................................. C08K 5/15
[52] U.S. Cl. ................................... 524/114; 524/127; 524/197; 524/198; 524/200; 524/251; 524/296; 524/297; 524/310; 524/313; 524/423; 524/425; 524/451; 524/495
[58] Field of Search ............... 524/114, 127, 251, 296, 524/297, 310, 313, 423, 425, 451, 495, 197, 198, 200

[56] References Cited

U.S. PATENT DOCUMENTS

| | | | |
|---|---|---|---|
| 3,245,942 | 4/1966 | Limperos | 524/197 |
| 3,401,135 | 9/1968 | Sato | 524/198 |
| 4,210,567 | 7/1980 | Kösters | 524/548 |
| 4,383,068 | 5/1983 | Brandt | 524/197 |
| 4,613,639 | 9/1986 | Blum et al. | 524/251 |
| 4,623,686 | 11/1986 | Hürnik et al. | 524/197 |
| 4,656,211 | 4/1987 | Nasu et al. | 524/198 |
| 4,663,377 | 5/1987 | Hombach et al. | 524/197 |

FOREIGN PATENT DOCUMENTS

| | | | |
|---|---|---|---|
| 1270800 | 6/1968 | Fed. Rep. of Germany | 524/197 |
| 2643642 | 3/1978 | Fed. Rep. of Germany | 524/197 |
| 1060837 | 3/1967 | United Kingdom | 524/198 |
| 1447274 | 8/1976 | United Kingdom | 524/197 |
| 1516510 | 7/1978 | United Kingdom | |

Primary Examiner—Joseph L. Schofer
Assistant Examiner—J. M. Reddick
Attorney, Agent, or Firm—Lewis H. Eslinger; Jay H. Maioli

[57] ABSTRACT

A polyvinyl chloride-free plastisol comprises
 a) 5 to 50% by weight of a methyl methacrylate-homopolymer or coplymer
 b) 10 to 50% by weight of a plasticiser,
 c) 20 to 70% by weight of a filler
 d) 2 to 30% by weight of a blocked poly isocyanate, and
 e) 0.2 to 5% by weight of a polyamine. The plastisol is particularly useful for sealing spot welded joints in, for example, motor vehicle manufacture.

22 Claims, No Drawings

POLYVINYL CHLORIDE-FREE PLASTISOL AND ITS USE

This is a continuation of application Ser. No. 06/800,821, filed Nov. 22, 1985 now abandoned.

BACKGROUND OF OF THE INVENTION

The present invention relates to a poly vinyl chloride-free plastisol which is particularly well suited for use in spot seam sealing, especially in motor vehicle construction.

The term plastisol was originally introduced to designate poly vinyl chloride pastes in the form of substantially intimate dispersions of poly vinyl chloride in a plasticiser, in which there could also be certain additives such as extenders, stabilisers, fillers, surface tension-changing materials and diluents. These poly vinyl chloride plastisols are used particularly for the production of synthetic leathers, floor coverings, coatings, conveyor belts and for rotational casting.

However, because of the hydrochloric acid content, which in certain conditions may be released from plastisols of this type based on poly vinyl chloride, the use of these plastisols is limited. Thus they are not suitable as sealing materials for the seam sealing of welded joints, in particular as seam seals in the spot welding of automobile bodies, since, during welding, temperatures are reached at which the poly vinyl chloride decomposes and this leads to corrosion of the welded parts.

However, sealing of the so-called spot seam (the welding is punctiform) is of considerable importance for protection against corrosion.

Therefore a series of synthetic pastes were developed which were called plastisols because of their basic properties and their usage, although they did not contain poly vinyl chloride. The present invention relates to a poly vinyl chloride-free plastisol of this type.

Plastisols of this type are known from DE-OS 1,479,491, U.S. Pat. No. 2,872,429, DE-PS 2,529,732 and DE-PS 2,454,235. None of these known plastisols fulfills the requirements of a plastisol for use in spot sealing.

The plastisols from DE-OS 1,479,491 and U.S. Pat. No. 2,872,429 do not have sufficient storage stability for use in motor vehicle construction.

The poly vinyl chloride-free plastisols known from DE-PS 2,454,235 and DE-PS 2,529,732 certainly have a satisfactory storage stability but have other deficiencies as regards their use for spot seam sealing. Thus, the plastisol according to DE-PS 2,454,235 does not have sufficient adhesive strength for such a use. Certain improvements in the adhesion can be achieved according to DE-PS 2,529,732 where heterocyclic compounds, which contain at least one N atom in the ring, are polymerised as adhesion promoters. However the technical properties thus achieved are not sufficient for use as spot seam sealing. Thus the adhesion promoters based on heterocyclic vinyl compounds according to DE-PS 2,529,732 lead to relatively brittle products, especially when they are used together with acrylic—or methacrylic acid esters, and these products have unsatisfactory properties when subjected to the dynamic stresses (loads) which occur in use. The above mentioned compounds are also not suitable for extensive use in motor vehicle construction because of their annoying smell.

One particular disadvantage of the known poly vinyl chloride-free plastisols according to DE-PS 2,529,732 relates to the elasticity, at low temperatures, of a seam seal produced from a plastisol of this type (rod bending test at $-30°$ C.). When using a plastisol as a spot seam seal it is crucial that a good adhesion is obtained not only with respect to smooth sheet metal but also with respect to sheet metals which are coated with zinc-rich paint. The plastisols from DE-PS 2,529,732 partially solubilise coatings of this type and the adhesion then becomes unsatisfactory.

Plastisol layer thicknesses up to 5mm are generally required for a spot seal. With coatings of this thickness there is a special requirement as regards the flexibility of the seal. Moreover, a satisfactory spot seam seal must have sufficient electrical conductivity. However, the addition of graphite to increase the conductivity in a plastisol of the conventional type has a deleterious effect in so far as rigidity and elasticity are concerned.

BRIEF SUMMARY OF THE INVENTION

The aim of the present invention is to produce a poly vinyl chloride-free plastisol which does not produce an annoying smell during processing and which is distinguished by good elasticity even at low temperatures, and also excellent adhesion to smooth sheet metals, galvanised sheet metals and sheet metals which are coated with zinc-rich paint.

According to the present invention there is provided a poly vinyl chloride-free plastisol comprising a) 5 to 50% by weight of a methyl methacrylate homopolymer or copolymer, b) 10 to 50% by weight of plasticiser, c) 20 to 70% by weight of a filler, d) 2 to 30% by weight of a blocked polyisocyanate, and e) 0.2 to 5% by weight of an aliphatic, cycloaliphatic or aromatic polyamine.

DETAILED DESCRIPTION

The poly vinyl chloride-free plastisol of the present invention, like other known poly vinyl chloride-free plastisols based on acrylate or methacrylate, contains a methacrylic acid ester polymer which is dispersed in a suitable plasticiser together with fillers.

According to the present invention the polymer is a methyl-methacrylate homopolymer or copolymer. The methyl methacrylate-copolymer can be of any known type already used for plastisols of this type. For example it can be a copolymer, as described in DE-PS 2,454,235. However, particularly preferred methyl methacrylate copolymers are those of methyl methacrylate and butyl methacrylate.

Having regard to the other components of the composition, the plasticiser can be selected from a large group of PVC plasticisers known per se or of other plasticisers which are generally commercially known products. One or more plasticisers may be present and can be selected from the groups of adipic-, phthalic- or sebacic acid esters, phosphoric acid esters, epoxidised fatty acid esters and oils, polymer plasticisers, or nitrogen- and sulphur-containing plasticisers. The plasticiser should be selected so that the resultant plastisol has a satisfactory paste-like consistency. Examples of suitable plasticisers are dioctyl phthalate, plasticisers based on esters of sebacic-, adipic- or phthalic acid (e.g. the commercial product Edenol D81), epoxidised fatty acid derivatives, esters and epoxidised soya bean oils (such as commercial products having the name Reoplast, e.g. Reoplast 39, Reoplast 42) or phosphoric acid esters (such as the products commercially obtainable under the name Santicizer).

The filler may be, for example, calcium carbonate, barium sulphate, talcum, graphite, carbon black or any mixtures of these substances.

The constituents of the poly vinyl chloride-free plastisol of the invention mentioned up to now include the corresponding constituents of known poly vinyl chloride-free plastisols based on acrylates, e.g. according to DE-PS 2 454 235. These constituents that are known per se can be freely varied taking into account the performance characteristics required of the eventual plastisol. The use of a methyl methacrylate polymer or a plasticiser or a filler which has not been expressly mentioned in the present application, but which is known per se for use in plastisols based on acrylate, comes within the scope of the present invention if combined with 2 to 30% by weight of a blocked polyisocyanate, and 0.2 to 5% by weight of an aliphatic, cycloaliphatic or aromatic polyamine particularly of a diamine, as required in accordance with the present invention.

The blocked poly isocyanate preferably has one or other of the following two general formulae:

$$R(NH-CO-OR_1)_m \quad (I)$$

or

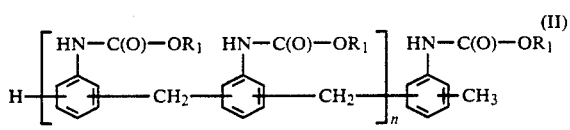

In the two general formulae $R_1$ indicates a $C_1$ to $C_{10}$ alkyl residue or groups, a cyclo alkyl residues or groups (in particular cyclo hexyl residues or groups unsubstituted or substituted phenyl residues or groups, (in particular $C_1$ to $C_4$ alkyl substitued phenyl residues or groups, wherein o-, m- and p-tolyl radicals and 2,3-, 2,4-, 2-5- or 2,6-dimethyl substituted phenyl residues or groups are particularly preferred). The latter being represented by the following general formula of:

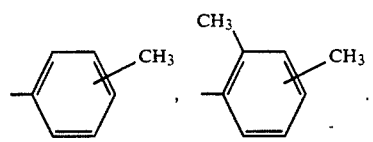

R in the first general formulae (I) is a $C_1$ to $C_{10}$ alkylene residue or group (which can be straight or branched), a cyclo alkylene residue or group (in particular a cyclo hexylene residue or group, or a bi- or tri-valent mono- or polynuclear aromatic residue or group wherein the aromatic nuclei of the residue are substituted singly or double by $C_1$ to $C_4$ alkyl substituents or halogen atoms or group (in particular chlorine- and bromine-atoms). The aromatic nuclei can thus be correspondingly substituted or unsubstitued phenylene- or naphthylene- residues or groups. Preferred residues or groups being represented by the following structural formulae of:

-continued

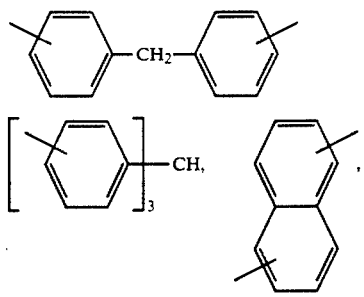

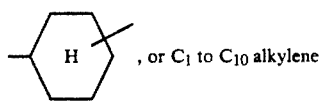, or $C_1$ to $C_{10}$ alkylene

In the formulae (I) and (II) m has a value of 2 or 3 and n is a whole number from 1 to 100.

Some of these blocked poly isocyanates are commercially obtainable under, for example, the names Desmocap 11, Desmocap 1280 Desmodur BL 1100, Desmodur BL 1265 or Uraflex 53 613.

The blocked polyisocyanates may be applied together with aliphatic and/or cyclo aliphatic and/or aromatic polyamines particularly of diamines.

Commercially available polyamines which may be used are, for example Laromin C 260, Laromin A 372 or Laromin C 252 (dipropylene triamine).

The blocked poly isocyanates, in conjunction with the polyamine, in high concentrations, replace part of the acrylate base and are therefore to be seen predominantly as constituents of the synthetic material. In low concentrations the influence of the synthetic material is less evident and the two constituents of the invention primarily fulfill an adhesion promotion function. It is an advantage of the poly vinyl chloride-free plastisols of the present invention that the blocked poly isocyanates and diamines do not have to be polymerised into the basic components of the plastisol. According to the prior art, it is necessary to polymerise the adhesion promoters so that radical formers, like e.g. peroxides, have to be added, the presence of which generally has a negative influence on the storage stability.

In addition to the ingredients already mentioned, thixotropic agents in amount of from 0.05 to 1% by weight of the entire mixture can also be included in the poly vinyl chloride-free plastisol of the invention.

The following Examples illustrate the invention

EXAMPLE 1

A plastisol of the following composition was produced:
- 25% by weight of a butyl methacrylate/methyl methacrylate-copolymer (25/75)
- 20% by weight of dioctyl phthalate
- 5% by weight of graphite
- 39% by weight of chalk
- 10% by weight of the blocked poly isocyanate known as Desmocap 11
- 1% by weight of a cycloaliphatic diamine known as Laromin C 260

This plastisol was applied to the sheet metal of an automobile body by means of a bead applicator and was spread to a depth of 5mm. Gelling was effected in 20 minutes at 170° C.

At 25° C. the sheet metal was bent round a rod with a diameter of 30mm.

The sample did not break.

COMPARISON EXAMPLE

A plastisol was produced from the constituents given in Example 1 and in the amounts specified there, except that neither a polyisocyanate nor a diamine were omitted. In their place 9% by weight of trimethylol triacrylate propane was used as a known adhesion promoter.

Gelling was effected at 170° C. within 20 minutes.

When bent round a rod of diameter 30mm the sample broke (test temperature 25° C.)

EXAMPLE 2

A plastisol of the following composition was produced:
20% by weight of butyl methacrylate/methyl methacrylate-copolymer (25/75)
20% by weight of dioctyl phthalate
5% by weight of graphite
38.5% by weight of heavy spar
15% by weight of the blocked polyisocyanate known as Desmocap 11
1 5% by weight of the cycloaliphatic diamine known as Loramin C 260

This plastisol was applied to the sheet metal of an automobile body in the form of a bead and was spread to a depth of 5mm. Gelling was effected at 170° C. in 20 minutes.

At 25° C. the sheet metal was bent round a rod with a diameter of 30mm.

The sample did not break.

We claim:

1. A polyvinyl chloride-free plastisol comprising a combination of the constituents:
    an acrylate-or methacrylate base being a methyl methacrylate homopolymer or copolymer together with fillers dispersed in a plasticiser and
    a urea-polymer constituent of blocked polyisocyanate in conjunction with a polyamine, wherein the urea-polymer does not have to be polymerized into the basic components and the base comprises the following components in the indicated amounts:
    a) 5 to 50% by weight of a methyl methacrylate homopolymer or copolymer,
    b) 10 to 50% by weight of a plasticiser,
    c) 20 to 70% by weight of a filler, and the urea-polymer comprises the following components in the indicated amounts,
    d) 2 to 30% by weight of a blocked polyisocyanate of the general formula:

R(NH—C(O)—OR$_1$)$_m$     (I)

wherein R is selected from the group consisting of a C$_1$ to C$_{10}$ aklylene group, a cycloalkylene group and a bi-or tri-valent mono or polynuclear aromatic group in which one or more of the aromatic nuclei is substituted by C$_1$ to C$_4$ alkyl groups or halogen atoms; R$_1$ is selected from the group consisting of a C$_1$ to C$_{10}$ alkyl group, a cycloalkyl group or a phenyl group substituted with a C$_1$ to C$_4$ alkyl group; and m is 2 or 3; or the general formula

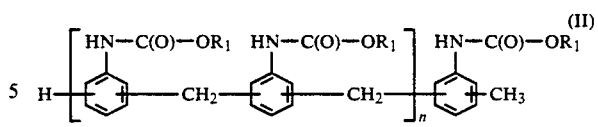

wherein R$_1$ is defined as above and n is an integer of from 1 to 100, and
    e) 0.2 to 5% by weight of an aliphatic, cycloaliphatic, or aromatic polyamine,
    wherein the blocked polyisocyanates, in conjunction with the polyamine of the urea-polymer, in high concentrations, replace part of the methacrylate base and fulfill an adhesion promotion function.

2. A plastisol as claimed in claim 1 wherein in the general formulae (I), (II)
    R$_1$ is selected from the group consisting of a C$_1$ to C$_{10}$ alkyl group, a cyclohexyl group, a phenyl group, a o-, m- and p-tolyl group or a 2,3-, 2,4-, 2-5- or 2,6-dimethyl substituted phenyl group and R is selected from the group consisting of

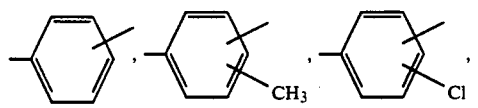

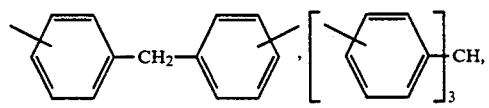

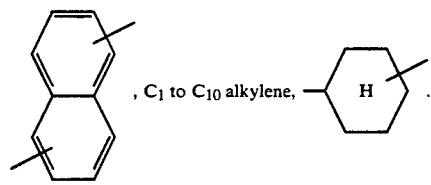

, C$_1$ to C$_{10}$ alkylene,

3. A plastisol as claimed in claim 2 wherein the polyamine is a diamine.

4. A plastisol as claimed in claim 1 wherein the methyl methacrylate-copolymer is a copolymer of methyl methacrylate and butyl methacrylate.

5. A plastisol as claimed in claim 1 wherein the plasticiser is selected from the group consisting of esters of sebacic, adipic and phthalic acid, phosphoric acid esters, epoxidised esters and oils, polymeric plasticisers, and nitrogen-and sulphur-containing plasticisers.

6. A plastisol as claimed in claim 1 wherein the filler is selected from the group consisting of calcium carbonate, barium sulphate, talcum, graphite, carbon black and mixtures thereof.

7. A plastisol as claimed in claim 1 , which additionally contains as a component
    f) in an amount from 0.05% to 1% by weight of a thixotropic agent.

8. A plastisol as claimed in claim 2, which additionally contains from 0.05% to 1% by weight of a thixotropic agent.

9. A plastisol as claimed in claim 2 wherein the methyl methacrylate-copolymer is a copolymer of methyl methacrylate and butyl methacrylate.

10. A plastisol as claimed in claim 7 wherein the methyl methacrylate-copolymer is a copolymer of methyl methacrylate and butyl methacrylate.

11. A plastisol as claimed in claim 8 wherein the methyl methacrylate-copolymer is a copolymer of methyl methacrylate and butyl methacrylate.

12. A plastisol as claimed in claim 2 wherein the plasticiser is selected from the group consisting of esters of sebacic, adipic and phthalic acid, phosphoric acid esters, epoxidised esters and oils, polymeric plasticisers, and nitrogen-and sulphur-containing plasticisers.

13. A plastisol as claimed in claim 7 wherein the plasticiser is selected from the group consisting of esters of sebacic, adipic and phthalic acid, phosphoric acid esters, epoxidised esters and oils, polymeric plasticisers, and nitrogen-and sulphur-containing plasticisers.

14. A plastisol as claimed in claim 8 wherein the plasticiser is selected from the group consisting of esters of sebacic, adipic and phthalic acid, phosphoric acid esters, epoxidised esters and oils, polymeric plasticisers, and nitrogen-and sulphur-containing plasticisers.

15. A plastisol as claimed in claim 9 wherein the plasticiser is selected from the group consisting of esters of sebacic, adipic and phthalic acid, phosphoric acid esters, epoxidised esters and oils, polymeric plasticisers, and nitrogen-and sulphur-containing plasticisers.

16. A plastisol as claimed in claim 2, wherein the filler is selected from the group consisting of calcium carbonate, barium sulphate, talcum, graphite, carbon black and mixtures thereof.

17. A plastisol as claimed in claim 7, wherein the filler is selected from the group consisting of calcium carbonate, barium sulphate, talcum, graphite, carbon black and mixtures thereof.

18. A plastisol as claimed in claim 8, wherein the filler is selected from the group consisting of calcium carbonate, barium sulphate, talcum, graphite, carbon black and mixtures thereof.

19. A plastisol as claimed in claim 9, wherein the filler is selected from the group consisting of calcium carbonate, barium sulphate, talcum, graphite, carbon black and mixtures thereof.

20. A plastisol as claimed in claim 10, wherein the filler is selected from the group consisting of calcium carbonate, barium sulphate, talcum, graphite, carbon black and mixtures thereof.

21. A plastisol as claimed in claim 11, wherein the filler is selected from the group consisting of calcium carbonate, barium sulphate, talcum, graphite, carbon black and mixtures thereof.

22. A plastisol as claimed in claim 12, wherein the filler is selected from the group consisting of calcium carbonate, barium sulphate, talcum, graphite, carbon black and mixtures thereof.

* * * * *